(12) United States Patent
Caraan et al.

(10) Patent No.: US 11,505,125 B2
(45) Date of Patent: Nov. 22, 2022

(54) VEHICLE DOOR MIRROR ASSEMBLY

(71) Applicant: Honda Motor Co., Ltd., Tokyo (JP)

(72) Inventors: Oscar A. Caraan, Delaware, OH (US); Nathan E. Palsa, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 16/985,692

(22) Filed: Aug. 5, 2020

(65) Prior Publication Data

US 2022/0041108 A1 Feb. 10, 2022

(51) Int. Cl.
*B60R 1/06* (2006.01)
*B60R 13/06* (2006.01)

(52) U.S. Cl.
CPC ............... *B60R 1/06* (2013.01); *B60R 13/06* (2013.01)

(58) Field of Classification Search
CPC ............ B60R 1/06; B60R 13/06; B60R 1/074
USPC ......................................... 359/871, 872, 841
See application file for complete search history.

(56) References Cited

U.S. PATENT DOCUMENTS

| | | | | |
|---|---|---|---|---|
| 3,229,581 | A * | 1/1966 | Walter | B60R 1/064 74/504 |
| 6,499,850 | B2 | 12/2002 | Waldmann | |
| 6,520,690 | B2 * | 2/2003 | Chu | G03B 17/00 396/419 |
| 7,448,762 | B2 * | 11/2008 | Su | B60R 1/076 248/478 |
| 8,342,702 | B2 | 1/2013 | Ohe | |
| 8,746,904 | B2 | 6/2014 | Herrmann et al. | |
| 9,340,158 | B2 | 5/2016 | Nishimura et al. | |
| 10,099,618 | B2 * | 10/2018 | Foote | B60R 1/076 |
| 10,589,683 | B2 * | 3/2020 | Bortolon | B60R 1/072 |
| 2006/0285236 | A1 * | 12/2006 | Huprikar | B60R 1/076 359/879 |
| 2009/0279195 | A1 * | 11/2009 | Itoh | B60R 1/074 359/872 |
| 2019/0176706 | A1 * | 6/2019 | Hamada | B60R 1/06 |
| 2019/0193636 | A1 * | 6/2019 | Sawada | B60R 1/076 |
| 2019/0315277 | A1 * | 10/2019 | Sawada | B60R 1/006 |
| 2021/0023999 | A1 * | 1/2021 | Rothschild | B60R 1/06 |

(Continued)

FOREIGN PATENT DOCUMENTS

| | | | |
|---|---|---|---|
| DE | 102010054372 | | 6/2012 |
| DE | 102018218499 | A1 * | 5/2019 |
| EP | 0940294 | | 4/2002 |

(Continued)

*Primary Examiner* — Ricky D Shafer (74) *Attorney, Agent, or Firm* — Rankin, Hill & Clark LLP (57) ABSTRACT

An external mirror assembly for a vehicle includes a support arm adapted to be affixed to an associated vehicle side door, and a housing movably connected to the support arm via a pivoting structure. The pivoting structure is connected to the support arm and to a bracket supported within the housing. A seal member surrounds the connection of the housing to the support arm. The seal member includes a base at least partially compressed by one of the support arm and the housing. The seal member includes an outer periphery portion defining a first seal lip and an inner periphery portion defining a second seal lip. One of the first seal lip and the second seal lip is configured to sealingly engage the support arm and the other of the first seal lip and the second seal lip configured to sealingly engage the housing.

15 Claims, 5 Drawing Sheets

(56) References Cited

U.S. PATENT DOCUMENTS

2021/0031690 A1* 2/2021 Rothschild ................ B60R 1/06
2021/0086694 A1* 3/2021 Rothschild .............. B60R 1/074

FOREIGN PATENT DOCUMENTS

| JP | 6083750 | 2/2017 |
| WO | 2019035078 | 2/2019 |

* cited by examiner

VEHICLE DOOR MIRROR ASSEMBLY

BACKGROUND

A known mirror assembly for a vehicle side door generally includes a housing, which has a glass assembly mounted thereto, supported on a support arm affixed to the vehicle side door. Typically, the housing is configured to rotate around an inner base member of the support arm in a way that allows the housing to fold forward or rearward, which is useful during an impact or preventing damage when parked. To allow for this movement, a joint or cutline gap is provided between the housing and the inner base member. Because this gap can cause wind noise concerns, a cutline seal member is positioned between the housing and the support arm to prevent wind noise. However, the seal member can resist the folding motion of the housing. Further, if the seal member is made from a hard material to provide minimal interference with the housing, this can compromise sealing performance as the seal member often presents possible leak paths due to assembly tolerances between the housing and the support arm.

BRIEF DESCRIPTION

According to one aspect, an external mirror assembly for a vehicle comprises a support arm adapted to be affixed to an associated vehicle side door, and a housing movably connected to the support arm via a pivoting structure. The pivoting structure is connected to the support arm and to a bracket supported within the housing. A seal member surrounds the connection of the housing to the support arm. The seal member includes a base at least partially compressed by one of the support arm and the housing. The seal member includes an outer periphery portion defining a first seal lip and an inner periphery portion defining a second seal lip. One of the first seal lip and the second seal lip is configured to sealingly engage the support arm and the other of the first seal lip and the second seal lip configured to sealingly engage the housing.

According to another aspect, an external mirror assembly for a vehicle comprises a support arm adapted to be affixed to an associated vehicle side door. The support arm includes an inner base member and a separate outer base member connected to the inner base member. A housing is movably connected to the support arm via a pivoting structure. The pivoting structure is connected to the support arm and to a bracket supported within the housing. A seal member surrounds the connection of the housing to the support arm. The seal member is mounted between the inner base member and the outer base member or between the housing and the bracket. The seal member is formed of a single unitary rubber material and includes an outer periphery portion defining a first seal lip and an inner periphery portion defining a second seal lip. One of the first seal lip and the second seal lip configured to sealingly engage the outer base member of the support arm, and the other of the first seal lip and the second seal lip configured to sealingly engage the housing.

According to another aspect, a method of assembling an external mirror assembly for a vehicle is provided. The mirror assembly includes a support arm having an inner base member and a separate outer base member, a seal member and a housing. The method comprises mounting the seal member to the inner base member; connecting the inner base member having the seal member mounted thereto to the outer base member to at least partially compress the seal member between the inner base member and the outer base member; mounting a pivot tube to the inner base member; and connecting the housing to the pivot tube.

DETAILED DESCRIPTION

Figure 1:
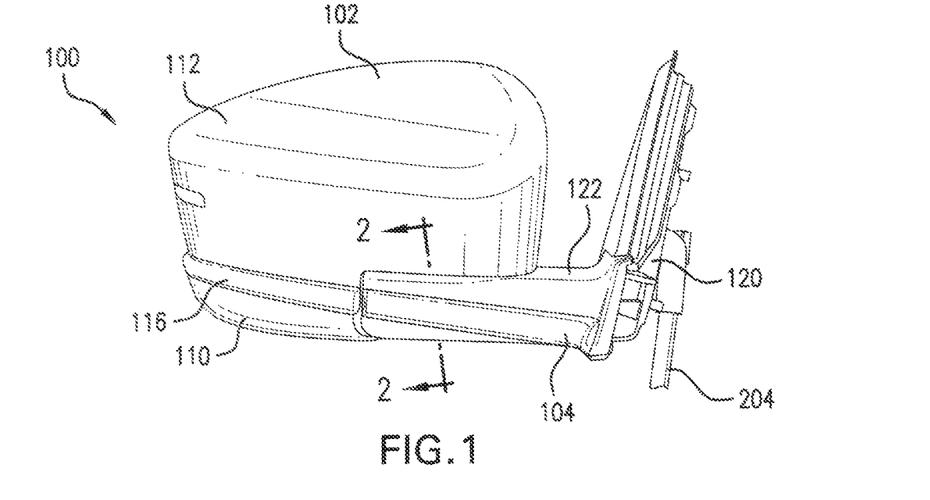
FIG. 1 is a rear perspective view of an external mirror assembly for a vehicle according to one aspect of the present disclosure, the external mirror assembly including a housing movably connected to a support arm.
Figure 2:
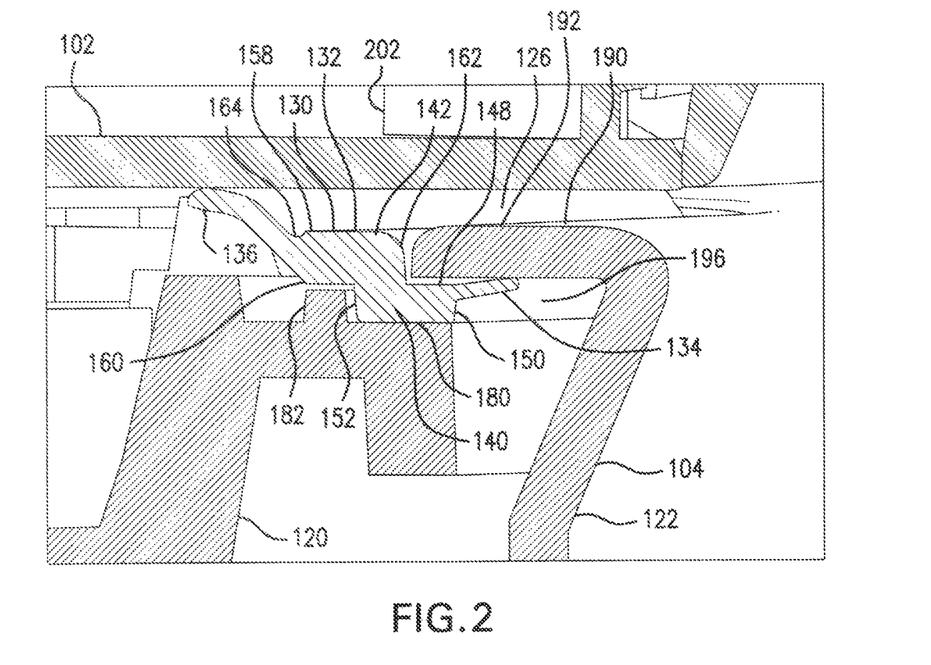
FIG. 2 is a partial cross-sectional view of the external mirror assembly of FIG. 1 taken generally along line 2-2 of FIG. 1.
Figure 3:
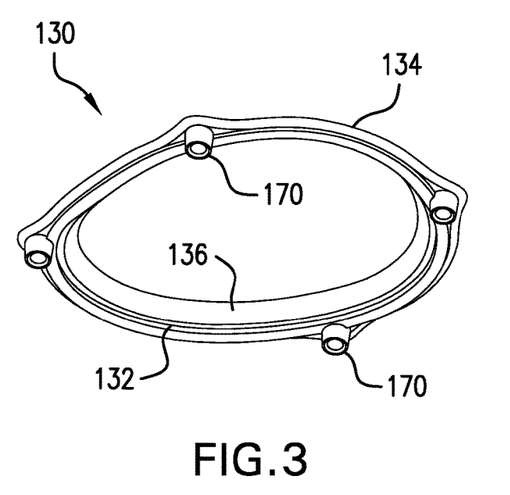
FIGS. 3, 4, 5 and 6 are views of an exemplary seal member for the external mirror assembly.
Figure 4:
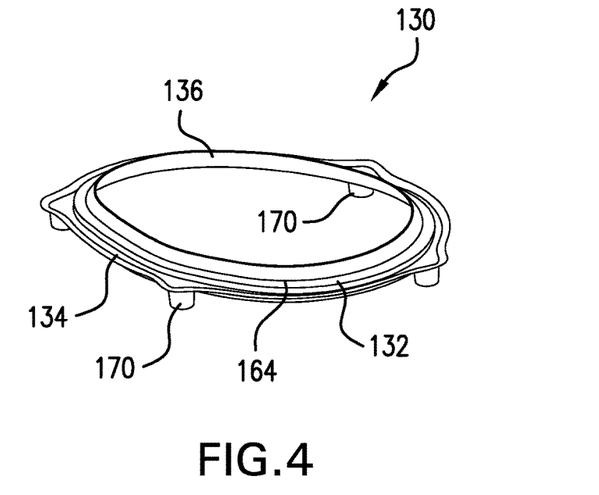
Figure 5:
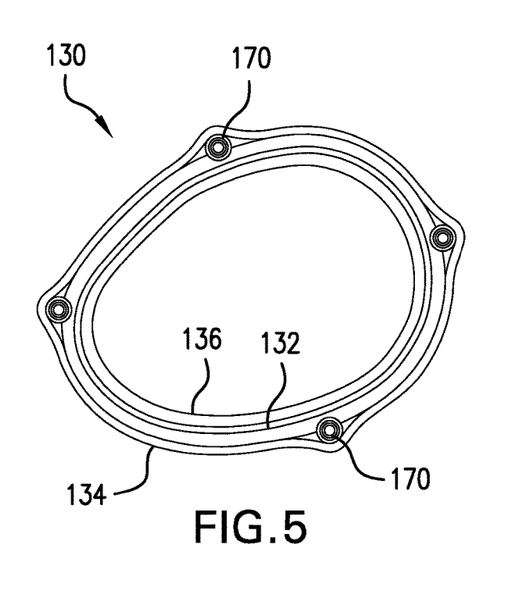
Figure 6:
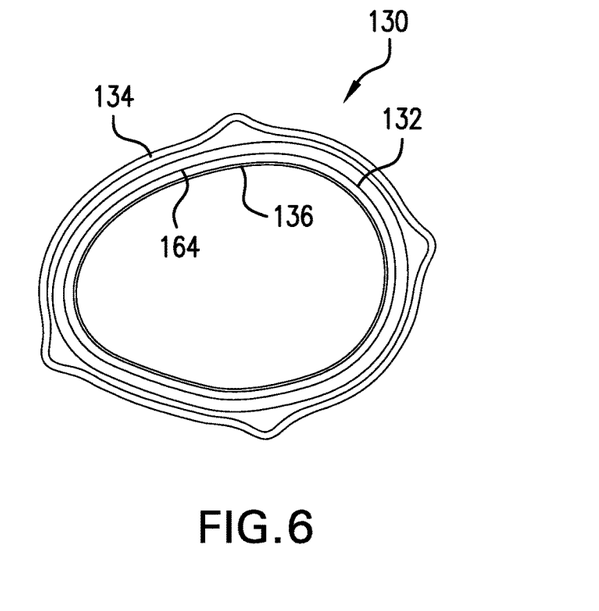

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 illustrate an exemplary external mirror assembly 100 for an associated vehicle according to the present disclosure. The external mirror assembly 100 generally includes a housing 102 movably mounted to a support arm 104 and a glass assembly (not shown) attached to the housing 102. The support arm 104 is adapted to be affixed to an associated vehicle side door, specifically to a forward side of an associated front door (not shown). The housing 102 can include a lower housing part 110 connected to a separate upper housing part 112, with a trim molding 116 secured between the lower and upper housing parts. The support arm 104 can include an inner base member 120 and a separate outer base member 122 connected to the inner base member. Typically, the housing 102 rotates around the support arm 104 in a way that allows the housing to fold forward or backward. This is useful during an impact or preventing damage when parked. To allow for this movement of the housing 102, a clearance or a gap 126 is defined between the housing and the support arm. A cutline seal member 130 is mounted to the support arm 104 and surrounds the connection of the housing 102 to the support arm. The seal member 130 generally closes over the gap 126 to limit water or dirt intrusion into the housing 102 and to reduce wind noise through the gap into the housing.

FIGS. 3-6 depict the features of the exemplary seal member 130. The seal member includes a base 132, a first seal lip 134 extended obliquely upward from an outer periphery portion of the base 132, and a second seal lip 136 extended obliquely upward from an inner periphery portion of the base 132. The first seal lip 134 is configured to sealingly engage the support arm 104, and the second seal lip 136 is configured to sealingly engage the housing 102.

Figure 7:
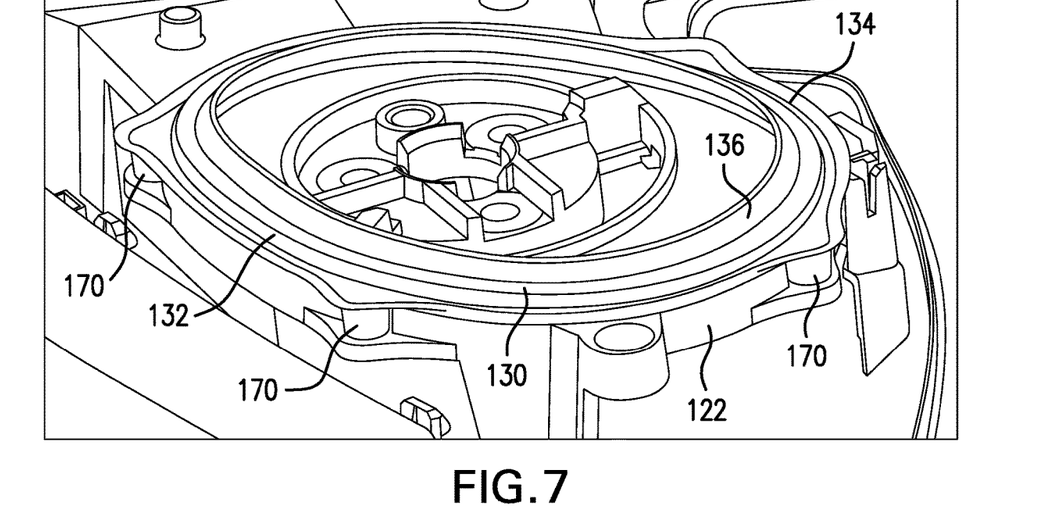
FIG. 7 is a perspective view of an assembly step for the external mirror assembly depicting the seal member first mounted to an inner base member of the support arm.

According to one aspect, the base 132 is stepped shaped in cross-section and includes a lower base section 140 and an upper base section 142 (see FIG. 2). As best depicted in FIG. 2, the lower base section 140 includes an upper surface 148, an outer side surface 150, and an inner side surface 152. The first seal lip 134 is extended from the outer side surface 150 to define an extension of the upper surface 148. Similarly, the upper base section 142 includes an upper surface 158, an inner side surface 160, and an outer side surface 162. The second seal lip 136 is extended from the inner side surface 160. In the depicted embodiment, the first seal lip 134 is extended from an upper section of the outer side surface 150, and the second seal lip 136 is extended from an entirety of the inner side surface 160. This arrangement allows the first seal lip 134 to have a greater degree of flexibility as compared to the second seal lip 136. Further shown is a groove 164 formed between the upper surface 158 of the upper base section 142 and the second seal lip 136, which facilitates downward deflection of the second seal lip 136 as the housing 102 is moved relative to the support arm 104. The seal member 130 also includes mounting bosses 170 that depend from the base 132 for connection to corresponding mounting posts (not shown) provided on the inner base member 120 (see FIGS. 7 and 8).

Figure 8:
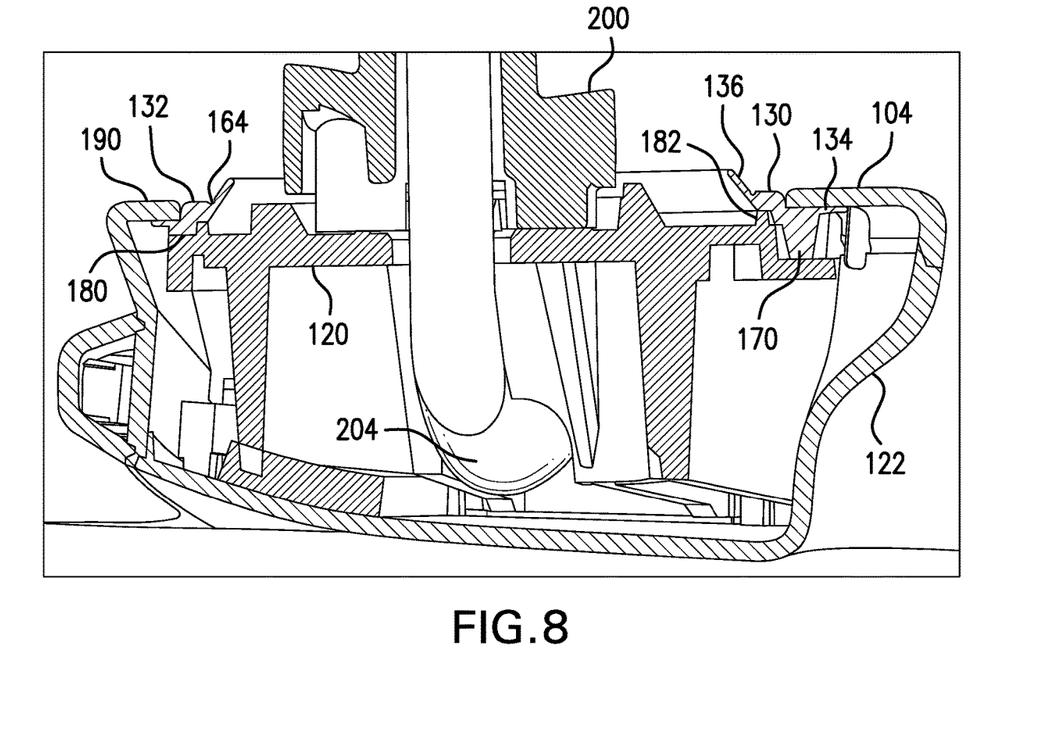
FIG. 8 is a cross-sectional view of an assembly step for the external mirror assembly depicting a pivot tube mounted to the support arm after the mounting of the seal member.

With reference to FIGS. 2 and 8, the inner base member 120 includes a platform 180 and a locating flange 182 provided on the platform. In an assembled condition of the exemplary mirror assembly 100, the lower base section 140 of the base 132 of the seal member 130 is seated on the platform 180 and the upper base section 142 of the base 132 is extended partially over the locating flange 182. The base 132 is at least partially compressed between the inner base member 120 and the outer base member 122 to provide a seal connection between these components. In the illustrated aspect, the outer base member 122 includes an inwardly extending flange 190 which engages the upper surface 148 of the lower base section 140 of the seal member. The upper base section 142 is substantially horizontally aligned with the flange 190 and the upper surface 158 of the upper base section is substantially flush with an upper surface 192 of the flange 190 of the outer base member 122. Therefore, with the seal member 130 sized to maintain the defined gap 126 between the housing 102 and the support arm 104 movement of the housing 102 is not restrained by the seal member 130. Further, with the outer base member 122 connected to the inner base member 120 a second clearance or gap 196 is defined between inner base member and the outer base member. The first seal lip 134 is extended through the second gap 196 to sealingly engage the outer base member, which additional seals the support arm 104 to prevent wind noise.

Figure 9:
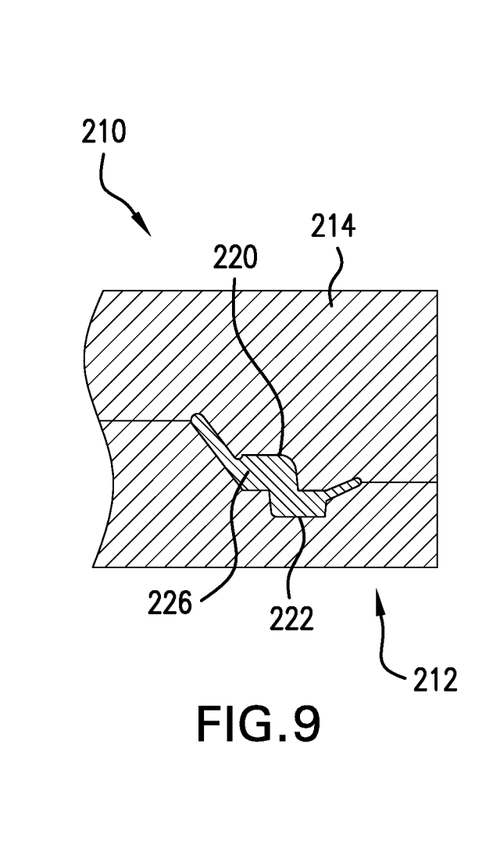
FIGS. 9, 10 and 11 schematically depict a method of forming the exemplary seal member.
Figure 10:
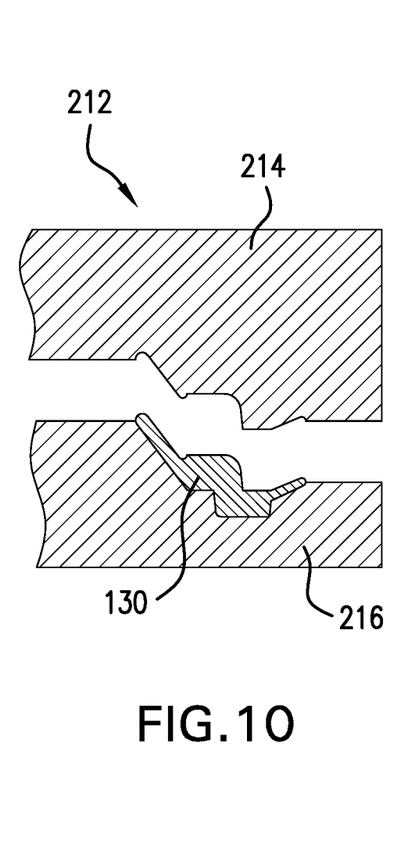
Figure 11:
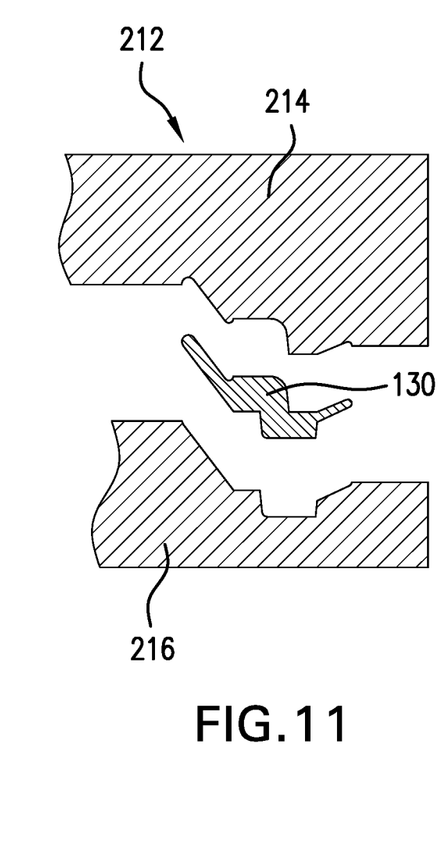

According to the present disclosure, and in contrast to known cutline seal members, the seal member 130 is entirely formed of a soft flexible material, for example a single unitary rubber material such as TPE or EPDM. And it should be appreciated that use of a single unitary material allows for simple open/close tooling to manufacture the seal member 130, which is also in contrast to known cutline seal members that typically require complex tooling to properly achieve a sealing condition between a moving mirror housing and a fixed support arm. By way of example, FIGS. 9-11 schematically depict a tooling arrangement 210 for molding the seal assembly 130. The tooling arrangement 210 includes an injection mold 212 having an upper mold half 214 and a lower mold half 216 and having mutually spaced upper and lower cavity wall portions 220, 222 defining a molding cavity 226 therebetween. The material for the seal member 130 is injected into the molding cavity 226, and when cured, the upper mold half 214, for example, can be moved to an open position and the seal member 130 can be released from the lower mold half 216.

With this construction of the seal member 130, the seal member is designed to allow for unrestricted movement of the housing 102 relative to the support arm 104. However, deflection of the seal member 130 can cause the seal member to move on the support arm 104. Therefore, the locating flange 182 is adapted to limit movement of the base 132 of the seal member 130 on the platform 180 during movement of the housing 102 relative to the support arm 104. More particularly, the base 132 includes the lower base section 140 and the upper base section 142. The lower base section 140 is seated on the platform 180, and is sized such that the outer side surface 150 is substantially flush with an outer surface 188 of the inner base member 120 and the inner side surface 152 abuts the locating flange 182. The upper base section 142 extends over the locating flange 182 and is at least partially seated on the locating flange. With this arrangement, the locating flange 182 can limit downwardly deflection of the upper base section 142 during movement of the housing 102 relative to the support arm 104, and this, in turn, limits movement of the lower base section 140 outwardly on the platform 180. Therefore, the position of the base 132 of the seal member 130 on the inner base member 120 is maintained.

As indicated previously, the housing 102 rotates around the support arm 104 in a way that allows the housing to fold forward or backward. To allow for this movement, a pivoting structure is provided between the housing 102 and the support arm 104. In the depicted aspect of FIG. 8, the pivoting structure includes a pivot tube 200 for mounting to the inner base member. After the seal member 130 is mounted to the inner base member 120 and the outer base member 122 is connected to the inner base member 120 to capture the seal member within the support arm 104, the pivot tube 200 is mounted to the inner base member 120. To interconnect the support arm and the housing, the pivot tube is connected to a bracket 202 (see FIG. 2) secured within the housing 102. As shown, a wiring harness 204 can be routed through the support arm 104 and the pivot tube 200 and into an interior of the housing 102 for connection to associated mirror electronics (not shown).

As is evident from the foregoing, a method of assembling the exemplary external mirror assembly 100 for a vehicle side door is provided. The mirror assembly includes the housing 102, the support arm 104 having the inner base member 120 and the separate outer base member 122, and the seal member 130. The method comprises mounting the seal member 130 to the inner base member 120; connecting the inner base member 120 having the seal member mounted thereto to the outer base member 122 to at least partially compress the seal member between the inner base member and the outer base member; mounting the pivot tube 200 to the inner base member; and connecting the housing 102 to the pivot tube.

The inner base member 120 includes the platform 180 and the locating flange 182 provided on the platform, and the exemplary method includes seating the base 132 of the seal member 130 on the platform and positioning the upper base section 142 of the base 132 over the locating flange 182 to limit deflection of the seal member 130 during movement of the housing 102 relative to the support arm 104. The seal member 130 includes the outer periphery portion defining the first seal lip 134 and the inner periphery portion defining the second seal lip 136, and the exemplary method includes sealingly engaging the outer base member 122 with the first seal lip and sealingly engaging the housing 102 with the second seal lip.

Figure 12:
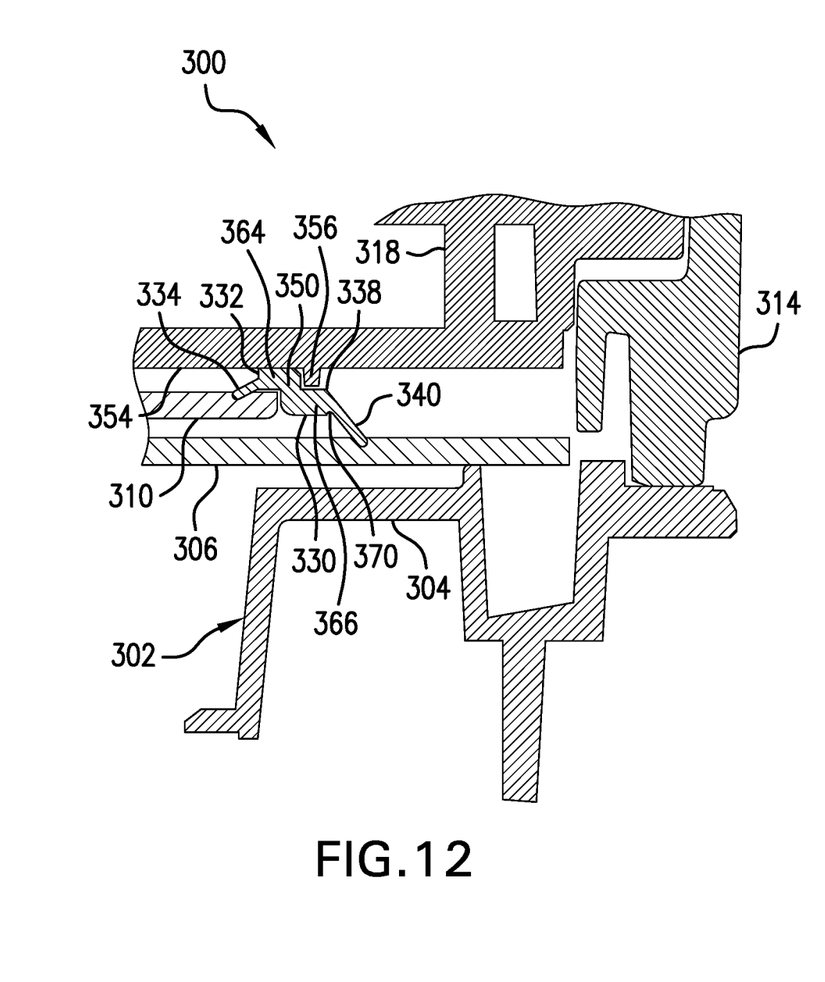
FIGS. 12 and 13 are partial cross-sectional views of an external mirror assembly for a vehicle according to another aspect of the present disclosure.
Figure 13:
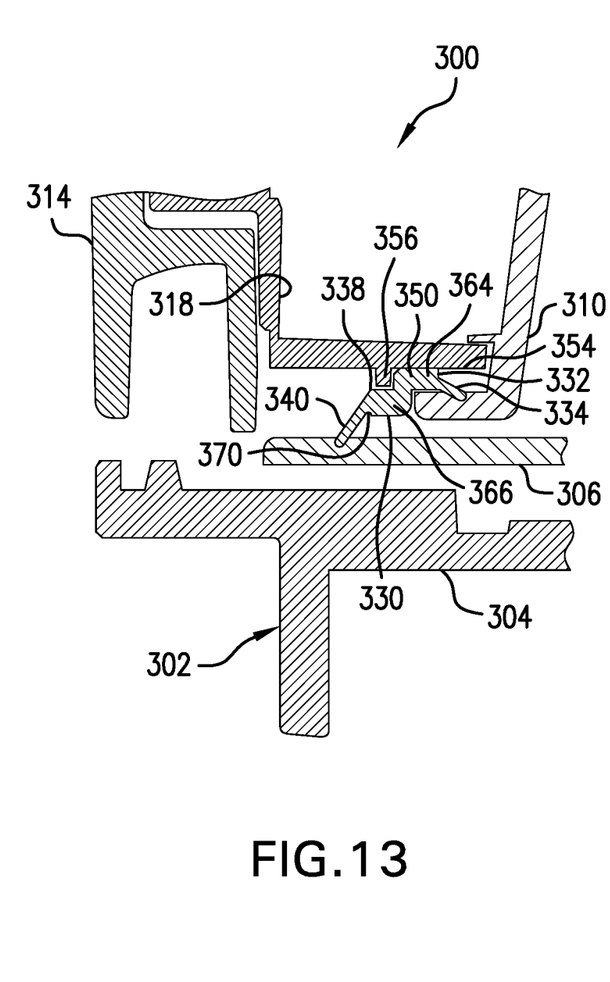

FIGS. 12 and 13 are partial cross-sections of an external mirror assembly 300 for a vehicle according to another aspect of the present disclosure. The external mirror assembly 300 comprises a support arm 302 adapted to be affixed to an associated vehicle side door. The support arm includes an inner base member 304 and a separate outer base member 306 connected to the inner base member. A housing 310 is movably connected to the support arm 302 via a pivoting structure, such as the depicted pivot tube 314. The pivot tube 314 is connected to the inner base member 304 of the support arm 302 and to a bracket 318 supported within the housing 310. A cutline seal member 330 surrounds the connection of the housing to the support arm and is mounted between the housing 310 and the bracket 318. Similar in construction to the seal member 130 described above, the seal member 330 is formed of a single unitary rubber material and includes an outer periphery portion 332 defining a first seal lip 334 and an inner periphery portion 338 defining a second seal lip 340. The first seal lip is configured to sealingly engage the housing 310 and the second seal lip is configured to sealingly engage the outer base member 306 of the support arm 302.

Further depicted, the seal member 330 includes a base 350 at least partially compressed between the housing 310 and the bracket 318. More particularly, the bracket 318 includes a base wall 354 and a locating flange 356 provided on the base wall. The base 350 of the seal member is stepped shaped in cross-section and includes an upper base section 364 and a lower base section 366. The first seal lip 334 is extended obliquely downward from the upper base section 364 and the second seal lip 340 is extended obliquely downward from the lower base section 366. As shown, the upper base section 364 is least partially compressed between an inner surface of the housing 310 and the base wall 354 of the bracket 318. The lower base section 366 extends over the locating flange 356 which is sized to limit upwardly deflection of the lower base section 366 during movement of the housing 310 relative to the support arm 302. In the depicted aspect, the lower base section 366 is substantially horizontally aligned with the housing 310. Therefore, the seal member 330 is sized to maintain a defined clearance or gap between the housing 310 and the support arm 302 and movement of the housing 310 is not restrained by the seal member 330. Further, a clearance or gap is defined between the housing 310 and the bracket 318, and the first seal lip 334 is extended through this gap to additional seal the housing 310 to prevent wind noise. Further shown is a groove 370 formed between the lower base section 366 and the second seal lip 340, which facilitates the upwardly deflection of the second seal lip 340 as the housing 310 is moved relative to the support arm 302.

It will be appreciated that the term "substantially" used herein means a reasonable amount of deviation of the modified word is contemplated such that the end result is not significantly changed. It will also be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An external mirror assembly for a vehicle comprising:
a support arm adapted to be affixed to an associated vehicle side door;
a housing movably connected to the support arm via a pivoting structure, the pivoting structure is connected to the support arm and to a bracket supported within the housing; and
a seal member surrounding the connection of the housing to the support arm, the seal member includes a base at least partially compressed by one of the support arm and the housing, the seal member includes an outer periphery portion defining a first seal lip and an inner periphery portion defining a second seal lip, one of the first seal lip and the second seal lip is configured to sealingly engage the support arm and the other of the first seal lip and the second seal lip configured to sealingly engage the housing,
wherein the support arm includes an inner base member and a separate outer base member connected to the inner base member, the seal member is mounted to the inner base member, and the base of the seal member is at least partially compressed between the inner base member and the outer base member.

2. The mirror assembly of claim 1, wherein with the outer base member connected to the inner base member a gap is defined between inner base member and the outer base member, the first seal lip is extended through the gap and configured to sealingly engage the outer base member.

3. The mirror assembly of claim 1, wherein the inner base member includes a platform and a locating flange provided on the platform, the base of the seal member is seated on the platform and the locating flange is adapted to limit movement of the base of the seal member on the platform during movement of the housing relative to the support arm.

4. The mirror assembly of claim 3, wherein the base is stepped shaped in cross-section, the base includes an upper base section and a lower base section, the lower base section is seated on the platform, and the upper base section extends over the locating flange.

5. The mirror assembly of claim 4, wherein the locating flange is sized to limit downwardly deflection of the upper base section during movement of the housing relative to the support arm.

6. The mirror assembly of claim 1, wherein the outer base member includes an inwardly extending flange engaging the base of the seal member, an upper surface of the base is substantially flush with an upper surface of the flange of the outer base member.

7. An external mirror assembly for a vehicle comprising:
a support arm adapted to be affixed to an associated vehicle side door, the support arm includes an inner base member and a separate outer base member connected to the inner base member;
a housing movably connected to the support arm via a pivoting structure, the pivoting structure is connected to the support arm and to a bracket supported within the housing; and
a seal member surrounding the connection of the housing to the support arm, the seal member mounted between the inner base member and the outer base member or between the housing and the bracket, the seal member is formed of a single unitary rubber material and includes a base having an outer periphery portion and an inner peripheral portion opposite the outer peripheral portion, the outer peripheral portion defining a first seal lip and the inner periphery portion defining a second seal lip, one of the first seal lip and the second seal lip configured to sealingly engage the outer base member of the support arm, and the other of the first seal lip and the second seal lip configured to sealingly engage the housing, wherein the base of the seal member is at least partially compressed between the inner base member and the outer base member or between the housing and the bracket.

8. The mirror assembly of claim 7, wherein the inner base member includes a platform and a locating flange provided on the platform, the base of the seal member is seated on the platform and the locating flange is adapted to limit movement of the base of the seal member on the platform during movement of the housing relative to the support arm.

9. The mirror assembly of claim 8, wherein the base is stepped shaped in cross-section, the base includes an upper base section and a lower base section, the lower base section is seated on the platform, the upper base section extends over the locating flange with the second seal lip extended from the upper base section and configured to sealingly engage the housing.

10. The mirror assembly of claim 9, wherein the seal member includes a groove formed between the upper base section and the second seal lip.

11. The mirror assembly of claim 7, wherein the bracket includes a base wall and a locating flange provided on the base wall, the base of the seal member is stepped shaped in cross-section, the base includes an upper base section and a lower base section, the upper base section is least partially compressed between an inner surface of the housing and the base wall of the bracket, and the lower base section extends over the locating flange with the second seal lip extended from the lower base section and configured to sealingly engage the support arm.

12. The mirror assembly of claim 11, wherein the locating flange is sized to limit upwardly deflection of the lower base section during movement of the housing relative to the support arm.

13. A method of assembling an external mirror assembly for a vehicle, the mirror assembly includes a support arm having an inner base member and a separate outer base member, a seal member and a housing, the method comprising:

mounting the seal member to the inner base member;

connecting the inner base member having the seal member mounted thereto to the outer base member to at least partially compress the seal member between the inner base member and the outer base member;

mounting a pivot tube to the inner base member; and connecting the housing to the pivot tube, wherein the seal member includes a first seal lip and a second seal lip, and the method includes sealingly engaging the outer base member with the first seal lip and sealingly engaging the housing with the second seal lip.

14. The method of claim 13, wherein the inner base member includes a platform and a locating flange provided on the platform, and the method includes seating a base of the seal member on the platform and positioning an upper base portion of the base over the locating flange to limit deflection of the seal member during movement of the housing relative to the support arm.

15. The method of claim 13, wherein the seal member includes an outer periphery portion defining the first seal lip and an inner periphery portion defining the second seal lip.

\* \* \* \* \*